June 4, 1935. H. J. McKEON 2,004,006
FASTENING DEVICE
Filed June 20, 1934 2 Sheets-Sheet 1
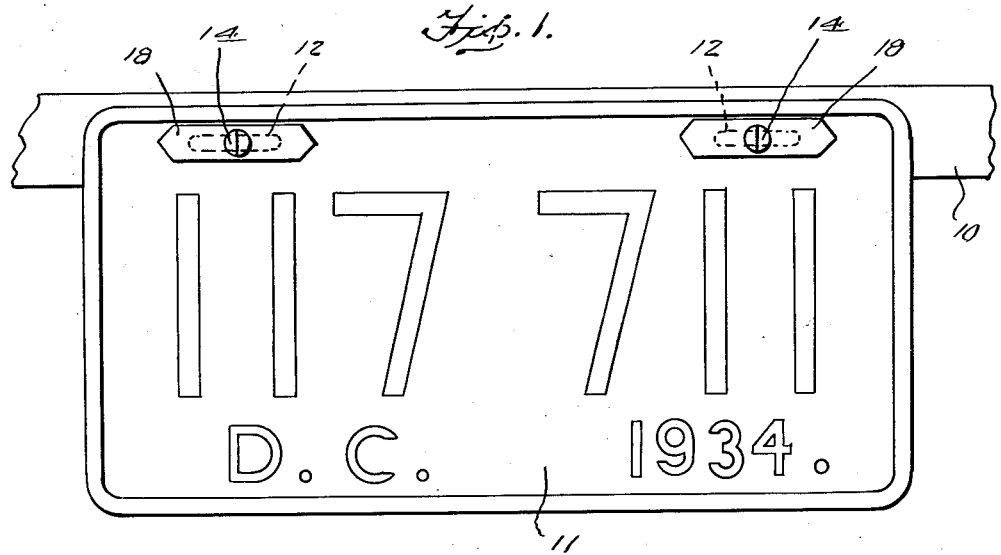
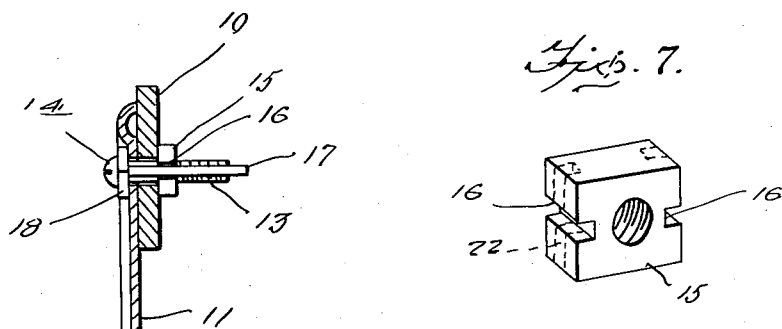
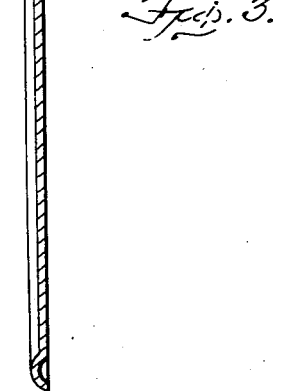
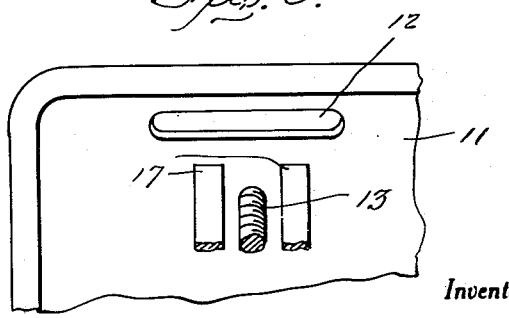
Inventor
H. J. McKeon
By Clarence A. O'Brien
Attorney June 4, 1935.  H. J. McKEON  2,004,006
FASTENING DEVICE
Filed June 20, 1934   2 Sheets-Sheet 2
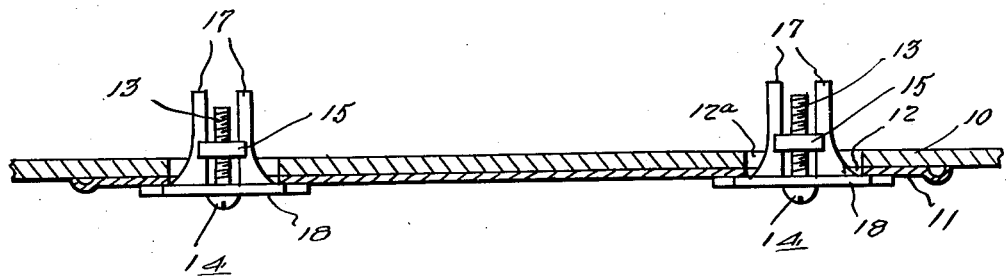
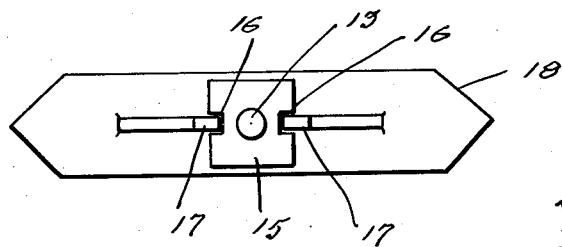
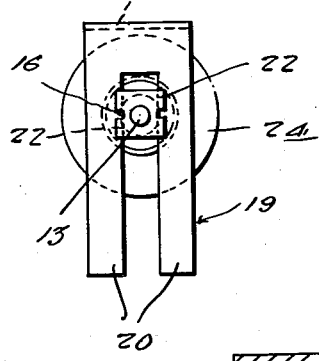
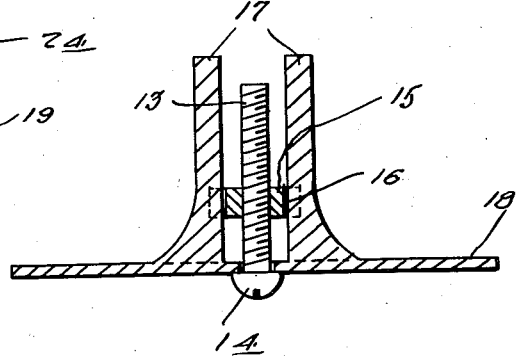
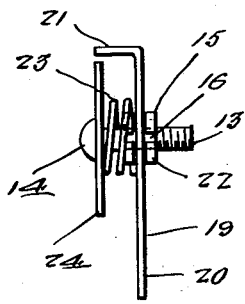
Inventor
H. J. McKeon
By Clarence A. O'Brien
Attorney Patented June 4, 1935

2,004,006

UNITED STATES PATENT OFFICE 2,004,006

FASTENING DEVICE

Harry J. McKeon, Galesburg, Ill.

Application June 20, 1934, Serial No. 731,509

1 Claim. (Cl. 151—33)

This invention relates to accessories and means employed for securely fastening complemental parts of a predetermined structure and has more particular reference to a simple bolt and nut connecting device embodying means for holding the nut against rotation.

The preferred forms of the invention adopted as illustrating the idea and principle have been perfected with the thought in mind of providing a means for satisfactorily securing an automobile license plate or tag to its supporting bracket and to accomplish this through the instrumentality of sufficient and practicable means including what may be designated as a nut lock calculated to effectively maintain the nut and bolt in non-loosening relationship.

Generically stated, the preferred embodiment of the invention as actually reduced to practice is characterized by an especially constructed nut fashioned to accommodate the complemental retention means, whereby when the two parts are properly joined and assembled, rotation of the nut is prevented, whereby to permit the bolt to be tightened or loosened as the case may be through the instrumentality of an ordinary screw-driver.

It is a matter of common knowledge that the usual way of fastening a license plate to the holder is by way of an ordinary bolt and nut arrangement. Under ordinary conditions, the nut sometimes becomes loose and is lost, or the nut becomes rusted on the bolt and it is difficult to remove the bolt when it is desired to replace the tag unless this is accomplished through the use of a pair of pliers or a wrench in conjunction with a screw driver. My idea involves the use of simple and economical means cooperable with the nut to hold it against rotation whereby not only to prevent displacement of the nut but to allow the bolt to be applied and removed without necessitating holding of the nut with a special tool.

Other features and advantages will become more readily apparent from the following description and drawings.

In the drawings:

Figure 1 is a front elevational view of a conventional license plate and holder showing the manner in which the invention is constructed and applied.

Figure 2 is a horizontal sectional view disclosing the assemblage a little more in detail.

Figure 3 is a vertical sectional view.

Figure 4 is a detailed elevational view of one embodiment of the invention showing the means utilized for holding the nut against rotation.

Figure 5 is a sectional view of the structure shown in Figure 4.

Figure 6 is a fragmentary detail view of a portion of the conventional slotted license plate or tag.

Figure 7 is a perspective view of one style or form of the nut.

Figure 8 is an elevational view of a slightly different set-up showing a variation in construction employing the same general principle and broad idea.

Figure 9 is an edge elevational view of the assemblage shown in Figure 8.

Attention is first invited more especially to the structural features illustrated in Figures 1 to 7 inclusive. This is due to the fact that the invention may be carried out in several ways and I have decided to show two of the principal embodiments of the invention, that is, one form in Figures 8 and 9 and another form in the remaining figures. Fundamentally, however, the idea is somewhat the same and has to do in particular with a satisfactory means for holding the nut against rotation so as to allow the bolt to be inserted and removed without requiring the use of a special tool.

In the drawings, in Figure 1, the support or hanger, sometimes referred to as the bracket, is denoted by the numeral 10 and is of any suitable construction to accommodate the conventional license plate or tag 11. This plate as shown in Figures 6 is provided with the usual horizontal longitudinally elongated bolt accommodation slots 12. The fastening bolt is denoted by the numeral 13 and is conventional and therefore provided with the usual head 14 having a screw-driver kerf to accommodate a standard screw-driver (not shown). It is of course evident that the bracket 10 as shown in Figure 2 is also provided with a slot 12a which registers with the slot 12 to accommodate the bolt and nut fastening means. The nut, which is detailed in Figure 7, is a regular square nut and is indicated by the numeral 15. The principal structural distinction is that the nut is provided on opposite peripheral edges, that is, on its rim, with a pair of opposed guide notches 16. These are adapted for reception of a pair of companion spaced parallel retaining fingers 17 carried on the back of a plate or other suitable carrier 18. The parts comprising the plate 18 and its retaining fingers may be conveniently referred to as an adapter as well as a nut lock. The style of the device shown in Figures 4 and 5, for example, is applicable to the assemblage indicated in Figures 1, 2, and 3. It is obvious, therefore, that the plate 18 fits against the license plate and that the fingers 17 extend through the registering slots and are fitted in the keeper notches or guides 16 in the nut. It follows, therefore, that with the parts thus assembled the nut is held against rotation, making it possible to insert or remove the bolt 13 in an expeditious and dependable manner.

In the arrangement shown in Figures 8 and 9, I also utilize a similar notched nut and adapter fixture. The adapter is here distinguished by the numeral 19 and comprises an L-shaped member embodying locking fingers 20 and has a flange 21 at one end. The fingers are adapted to fit into grooves 22 formed in opposed edges of the nut. Otherwise the nut is the same as that shown in Figure 7 and denoted by the numeral 15. The bolt is also the same, although in this arrangement, I have merely added, as shown in Figures 8 and 9, a spring 23 and a washer 24. These are incidental retention features.

The gist of the invention is found in the use of a nut 15 having the notches 16 as well as the grooves 22, said nut being cooperable with the threaded stem of the bolt 13 and the features 16 and 22 being used depending on the nature of the adapter employed. When the adapter shown in Figure 4 is used, the fingers 17 extend into the notches 16. When the adapter 19 in Figure 9 is used, the fingers 20 extend into the grooves 22. In either instance, the principle is virtually the same.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

What is claimed is:

A fastener of the class described, comprising a bolt and nut, said nut being provided in its marginal portions with a pair of opposed keeper notches for reception of an adapter, as well as in the adjacent rim portions with grooves intersecting said notches for receiving a second adapter, each adapter embodying fingers for reception in the notches and grooves.

HARRY J. McKEON.